(12) United States Patent
Tahara et al.

(10) Patent No.: US 8,037,675 B2
(45) Date of Patent: Oct. 18, 2011

(54) EXHAUST GAS PURIFICATION SYSTEM FOR INTERNAL COMBUSTION ENGINE AND METHOD FOR EXHAUST GAS PURIFICATION

(75) Inventors: Jun Tahara, Toyota (JP); Fuminori Honjo, Kariya (JP)

(73) Assignees: Toyota Jidosha Kabushiki Kaisha, Toyota-shi, Aichi-ken (JP); Kabushiki Kaisha Toyota Jidoshokki, Kariya-shi, Aichi-ken (JP)

( * ) Notice: Subject to any disclaimer, the term of this patent is extended or adjusted under 35 U.S.C. 154(b) by 967 days.

(21) Appl. No.: 11/812,320

(22) Filed: Jun. 18, 2007

(65) Prior Publication Data
US 2008/0006024 A1 Jan. 10, 2008

(30) Foreign Application Priority Data
Jun. 19, 2006 (JP) ................... 2006-169345

(51) Int. Cl.
*F01N 3/00* (2006.01)
(52) U.S. Cl. ............... 60/286; 60/274; 60/285; 60/295; 60/290
(58) Field of Classification Search .......... 60/273, 60/274, 285, 286, 287, 289, 290, 295, 299, 60/300, 301, 303
See application file for complete search history.

(56) References Cited

U.S. PATENT DOCUMENTS
| | | | |
|---|---|---|---|
| 2005/0022514 A1* | 2/2005 | Kitahara | 60/285 |
| 2005/0050881 A1* | 3/2005 | Toshioka et al. | 60/285 |
| 2005/0120712 A1* | 6/2005 | Tsutsumoto et al. | 60/297 |

FOREIGN PATENT DOCUMENTS
| | | |
|---|---|---|
| DE | 199 45 336 | 3/2001 |
| DE | 10 2005 014 872 | 11/2005 |
| DE | 2005 014 872 | 11/2005 |
| EP | 1 154 130 | 11/2001 |
| EP | 1 174 600 | 1/2002 |
| EP | 1 365 117 | 11/2003 |
| EP | 1 510 671 | 3/2005 |
| JP | 2005-155500 | 6/2005 |

OTHER PUBLICATIONS

Office Action from the German Patent Office for DE 102007027886, dated Aug. 10, 2009.
French Patent Office Communication dated Feb. 16, 2011 for FR 07 04299.

\* cited by examiner

*Primary Examiner* — Thomas Denion
*Assistant Examiner* — Jesse Bogue
(74) *Attorney, Agent, or Firm* — Finnegan, Henderson, Farabow, Garrett & Dunner LLP

(57) ABSTRACT

A PM catalyst regeneration control for the purpose of "soot removal" is performed prior to a sulfur poisoning recovery control. In the PM catalyst regeneration control, PM deposits in a catalyst are burned. A target throttle opening degree for the sulfur poisoning recovery control is preset smaller than a target throttle opening for the PM catalyst regeneration control in order to reduce the intake air volume during deceleration. A catalyst bed temperature is thus prevented from dropping, and therefore maintained at a level appropriate to sulfur poisoning recovery. Controlling the intake air volume during deceleration in such a manner results in more efficient catalyst recovery from sulfur poisoning, so that the fuel economy is maintained during the sulfur poisoning recovery control.

10 Claims, 4 Drawing Sheets

EXHAUST GAS PURIFICATION SYSTEM FOR INTERNAL COMBUSTION ENGINE AND METHOD FOR EXHAUST GAS PURIFICATION

INCORPORATION BY REFERENCE

The disclosure of Japanese Patent Application No. 2006-169345 filed on Jun. 19, 2006 including the specification, drawings and abstract is incorporated herein by reference in its entirety.

BACKGROUND OF THE INVENTION

1. Field of the Invention

The present invention relates to a system and a method for purifying exhaust gas from an internal combustion engine using a catalyst. More particularly, the invention relates to an exhaust gas purification system for an internal combustion engine that includes a supplemental fuel valve for supplying supplemental fuel to an exhaust passage, as well as relates to an exhaust gas purification method.

2. Description of the Related Art

The exhaust gas purification system for purifying exhaust gas from the internal combustion engine, such as a diesel engine, (hereinafter sometimes called engine) has, as one example, an $NO_x$ storage reduction catalyst and a particulate filter for trapping particulate matter (hereinafter referred to as PM) contained in exhaust gas.

The $NO_x$ storage reduction catalyst is designed to purify exhaust gas by means of storing $NO_x$ in the presence of when the oxygen concentration in the exhaust gas is high and reducing $NO_x$ to $N_2$ when the concentration of oxygen of the exhaust gas is low and a large amount of reductants (e.g., unburned component of fuel, such as HC) are available in the exhaust gas. For example, a diesel particulate filter (DPF) or a diesel particulate-$NO_x$ reduction system (DPNR) catalyst is used as the particulate filter (hereinafter referred to as filter) for trapping PM.

The aforementioned exhaust gas purification system, which has an $NO_x$ storage reduction catalyst and a filter in the exhaust passage, performs a PM catalyst regeneration control, a sulfur poisoning recovery control and an $NO_x$ reduction control (hereinafter collectively referred to as catalyst control). The PM catalyst regeneration control regenerates the filter by oxidizing and removing PM deposits in the filter. The sulfur poisoning recovery control recovers the $NO_x$ storage reduction catalyst from sulfur poisoning by eliminating $SO_x$ stored in the $NO_x$ storage reduction catalyst. The $NO_x$ reduction control chemically reduces $NO_x$ stored in the $NO_x$ storage reduction catalyst.

One of these catalyst controls, the PM catalyst regeneration control, involves estimating the amount of PM deposits in the filter based on the operating conditions of the engine. The PM catalyst regeneration control further involves supplying supplemental fuel from a supplemental fuel valve to the exhaust passage (upstream of the filter) when the estimated amount of PM deposits is equal to or greater than a specified value (maximum allowable deposit amount). The supply of supplemental fuel increases bed temperature, thereby promoting oxidization (combustion) of the PM deposits in the filter.

The sulfur poisoning recovery control recovers the $NO_x$ storage reduction catalyst from sulfur poisoning. The sulfur poisoning recovery control involves supplying supplemental fuel from the supplemental fuel valve to the exhaust passage. This increases the catalyst bed temperature and simultaneously adjusts the air-fuel ratio of exhaust gas to a stoichiometric or richer ratio. The sulfur poisoning recovery control further involves eliminating $SO_x$ stored in the $NO_x$ storage reduction catalyst. In turn, the $NO_x$ reduction control chemically reduces $NO_x$. In the $NO_x$ reduction control, supplemental fuel is supplied from the supplemental fuel valve to the exhaust passage and fed to the $NO_x$ storage reduction catalyst where the $NO_x$ stored in the catalyst reacts with a fuel component (HC).

The exhaust gas purification system also has a disadvantage. When the amount of PM deposits is greater than a specified value (e.g. immediately before or in the course of the PM catalyst regeneration control), and the volume of intake air decreases due to deceleration of the engine, the reduced volume of intake air may prevent the quantity of heat generated by burning the PM deposits from being transferred. This may cause an excessive increase in catalyst bed temperature. To overcome this problem, a related art is proposed in JP-A-2005-155500, paragraph [0003] as follows. During the PM catalyst regeneration control, if the engine is decelerating, the throttle valve in the intake passage is opened to increase the amount of air in exhaust gas, thereby increasing the amount of heat that is transferred by air passing through the catalyst. This prevents an excessive increase in catalyst bed temperature.

In addition, JP-A-2005-155500 further describes the situation where the volume of intake air is increased during the PM catalyst regeneration control when the engine is decelerating, the catalyst bed temperature is high, and the amount of PM deposits is large. Under these conditions, the quantity of heat generated by burning the PM deposits is greater than the quantity of heat that can be transferred by the air contained in exhaust gas. This can cause an abrupt increase in the catalyst bed temperature. Under such circumstances, it is necessary to inhibit the increase in volume of intake air.

Before the sulfur poisoning recovery control, the engine exhaust gas purification system performs the PM catalyst regeneration control to burn the PM deposits in the filter. This is called a "soot removal" process. Thereby, the amount of PM deposits is already reduced when the sulfur poisoning recovery control performed after the PM catalyst regeneration control. There is thus no excessive increase in catalyst bed temperature that occurs as a result of burning the PM deposits. In such situation, however, if the volume of intake air increases during deceleration in the same manner as under the PM catalyst regeneration control, an excess of air would pass through the filter. This prevents the catalyst bed temperature from being kept high, so that the temperature decreases. As a result of such reduced catalyst bed temperatures, the recovery of the catalyst from sulfur poisoning is more difficult. Accordingly, it takes longer for the $NO_x$ storage reduction catalyst to recover from sulfur poisoning, which increases the supplemental fuel supply quantity. Because additional supplemental fuel is required for raising the catalyst bed temperature, fuel economy is reduced.

SUMMARY OF THE INVENTION

The present invention provides an exhaust gas purification system for an internal combustion engine and an exhaust gas purification method, which maintains fuel economy during the sulfur poisoning recovery control.

A first aspect of the invention is directed to an exhaust gas purification system for an internal combustion engine, the system having a catalyst disposed in an exhaust passage in the internal combustion engine and a supplemental fuel valve for supplying supplemental fuel to the exhaust passage. The system executes control of the catalyst, including a PM catalyst regeneration control and a sulfur poisoning recovery control. In the exhaust gas purification system, a target value for controlling the intake air volume during deceleration is preset smaller for the sulfur poisoning recovery control than for the PM catalyst regeneration control.

According to the first aspect, the sulfur poisoning recovery control is executed after the PM catalyst regeneration control for the purpose of "soot removal" in which the PM deposits in the catalyst are burned. For the sulfur poisoning recovery control, the target value for controlling the intake air volume during deceleration is preset smaller than for the PM catalyst regeneration control in order to reduce the intake air volume during deceleration. The catalyst bed temperature is thus prevented from dropping, and therefore maintained at a level appropriate to sulfur poisoning recovery. This results in more efficient catalyst recovery from sulfur poisoning, and therefore a shorter recovery time. Further, the catalyst bed temperature can be maintained at a high level, thereby reducing a quantity of supplemental fuel needed to raise the catalyst bed temperature.

According to the first aspect, when the amount of PM deposits is less than a reference amount when the PM catalyst regeneration control is executed, the target value for controlling the intake air volume during deceleration may be preset smaller than in the case where the amount of PM deposits is equal to or larger than the reference amount. Using such a configuration, the appropriate volume of intake air volume during deceleration to burn the PM deposits in the catalyst may be determined. This prevents a drop in catalyst bed temperature due to the excessive increase in intake air volume during the PM catalyst regeneration. Thereby, more efficient PM catalyst regeneration is achieved.

According to the first aspect, the internal combustion engine may be a diesel engine. In addition, the internal combustion engine may be mounted on a vehicle. Further, each target value for controlling the intake air volume during the sulfur poisoning recovery control and the PM catalyst regeneration control may be determined by adjusting the degree of throttle opening in the internal combustion engine.

A second aspect of the invention is directed to an exhaust gas purification method for an internal combustion engine. The exhaust gas purification method includes supplying supplemental fuel, used for the internal combustion engine, to an exhaust passage to execute control of the catalyst disposed in the exhaust passage in the internal combustion engine. The control of the catalyst includes a PM catalyst regeneration control and a sulfur poisoning recovery control. The exhaust gas purification method further includes presetting a target value for controlling the intake air volume smaller for the sulfur poisoning recovery control than for the PM catalyst regeneration control.

According to the second aspect, the PM catalyst regeneration control may be executed prior to the sulfur poisoning recovery control.

According to the second aspect, when an amount of PM deposits is less than a reference amount when the PM catalyst regeneration control is executed, the target value for controlling the intake air volume may be preset smaller than in the case where the amount of PM deposits is equal to or larger than the reference amount.

According to the second aspect, each target value for controlling the intake air volume for the sulfur poisoning recovery control and the PM catalyst regeneration control may be a target value for controlling the intake air volume during deceleration of a vehicle having the internal combustion engine.

According to the second aspect, each target value for controlling the intake air volume during the sulfur poisoning recovery control and the PM catalyst regeneration control may be determined by adjusting a degree of throttle opening in the internal combustion engine.

According to the aforementioned aspects of the invention, the sulfur poisoning recovery control is executed after the PM catalyst regeneration control. For the sulfur poisoning recovery control, the target value for controlling the intake air volume during deceleration is preset smaller than for the PM catalyst regeneration control, in order to reduce the intake air volume during deceleration. The catalyst bed temperature is thus prevented from dropping, and therefore maintained at a level appropriate to sulfur poisoning recovery. This results in more efficient catalyst recovery from sulfur poisoning, so that the fuel economy is maintained during the sulfur poisoning recovery control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
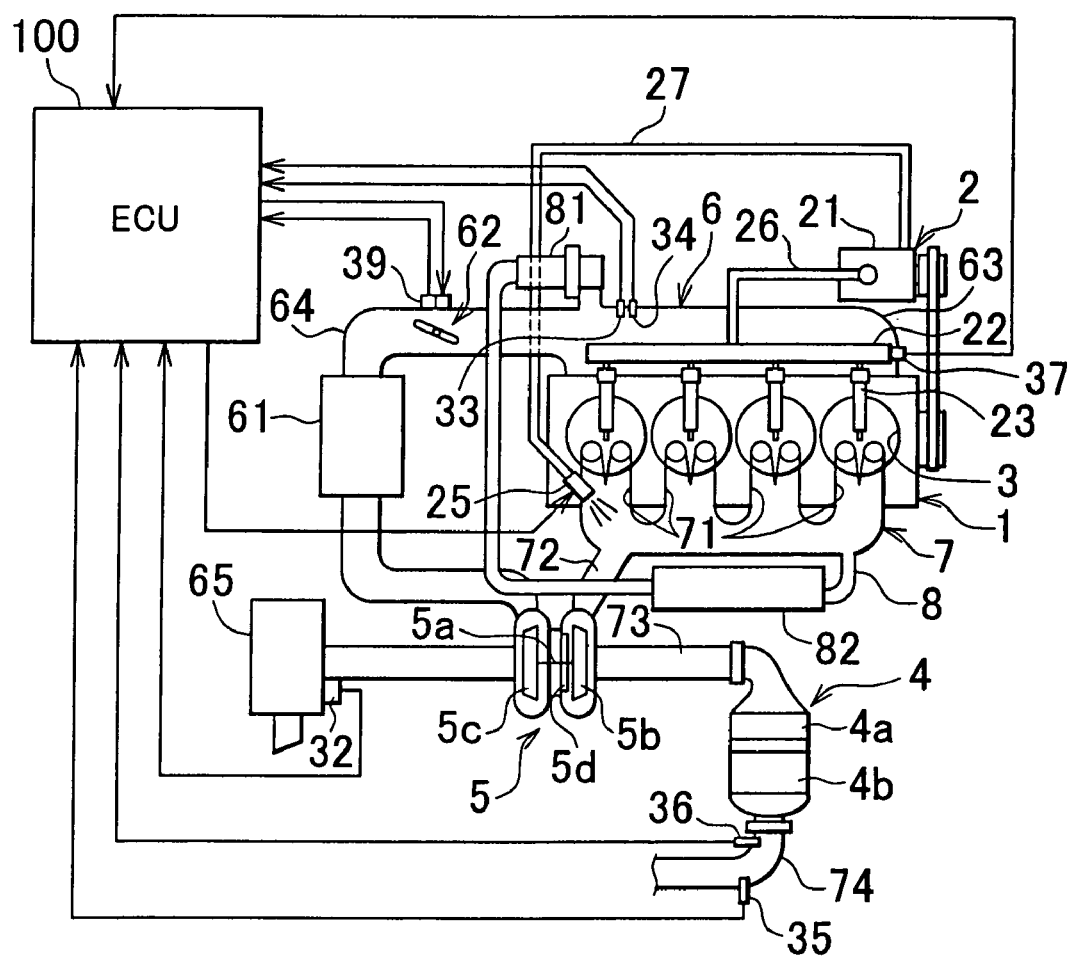
FIG. 1 is a schematic diagram showing an example of a diesel engine to which the invention is applied.

One embodiment of the invention will be described below with reference to the drawings. A general configuration of a diesel engine using a supplemental fuel supply apparatus of the invention is described with reference to FIG. 1.

In this embodiment, the diesel engine 1 (hereinafter referred to as "engine 1") is a common rail direct-injection four-cylinder engine. The engine 1 includes, as main components, a fuel supply system 2, combustion chambers 3, an intake system 6 and an exhaust system 7.

The fuel supply system 2 includes a fuel supply pump 21, a common rail 22, injectors (fuel injection valves) 23, a supplemental fuel valve 25, an engine fuel passage 26 and a supplemental fuel passage 27.

The fuel supply pump 21 draws fuel from the fuel tank and pressurizes the fuel to supply the high-pressure fuel to the common rail 22 through the engine fuel passage 26. The common rail 22 functions as an accumulator to maintain the pressure of fuel supplied from the fuel supply pump 21 at a specified level (accumulating the high-pressure fuel supplied from the fuel supply pump 21). The common rail 22 distributes the accumulated fuel to the injectors 23. Each injector 23 is an electromagnetically driven valve that opens when a specified voltage is applied to spray fuel into the associated combustion chamber 3.

The fuel supply pump 21 is designed to supply part of the fuel drawn from the fuel tank to the supplemental fuel valve 25 through the supplemental fuel passage 27. The supplemental fuel valve 25 is an electromagnetically driven valve that opens when a specified voltage is applied to supply supplemental fuel to the exhaust system 7 (from exhaust ports 71 to an exhaust manifold 72). An injection hole of the supplemental fuel valve 25 is exposed to the interior of the exhaust system 7.

The intake system 6 has an intake manifold 63 connected to intake ports formed on a cylinder head. An intake pipe 64, included in the intake passage, is connected to the intake manifold 63. An air cleaner 65, an airflow meter 32 and a throttle valve 62 are disposed in the intake passage in order from the upstream side. The airflow meter 32 is designed to output an electric signal in response to the volume of airflow into the intake passage through the air cleaner 65.

The exhaust system 7 has an exhaust manifold 72 connected to the exhaust ports 71 formed on the cylinder head. Exhaust pipes 73 and 74, included in the exhaust passage, are connected to the exhaust manifold 72. A catalytic converter 4 is also disposed in the exhaust passage.

The catalytic converter 4 includes a $NO_x$ storage reduction (NSR) catalyst 4a and a DPNR catalyst 4b.

The NSR catalyst 4a may contain, for instance, an alumina ($Al_2O_3$) carrier and several types of metal placed on the aluminum carrier. They include alkaline metal, such as potassium (K), sodium (Na), lithium (Li) and cesium (Cs), alkaline-earth metal, such as barium (Ba) and calcium (Ca), rare earth metal, such as lanthanum (La) and yttrium (Y), and noble metal, such as platinum (Pt).

The NSR 4a is designed to store $NO_x$ in the presence of a high oxygen concentration in exhaust gas and otherwise reduce $NO_x$ to $NO_2$ or NO as emissions in the presence of a low oxygen concentration and a large amount of reduced component (unburned component of fuel, such as HC) in exhaust gas. The $NO_x$ emissions in the form of $NO_2$ or NO react immediately with HC or CO contained in exhaust gas, so that the $NO_2$ or NO is reduced to $N_2$. The reduction of $NO_2$ or NO to $N_2$ causes HC or CO to be oxidized to $H_2O$ or $CO_2$.

In one example, the DPNR catalyst 4b employs a porous ceramic structure that contains the $NO_x$ storage reduction catalyst. The PM in exhaust gas is trapped when passing through a porous wall. When the air-fuel ratio of exhaust gas is lean, the $NO_x$ storage reduction catalyst stores $NO_x$ present in the exhaust gas. When the air-fuel ratio is riched, the stored $NO_x$ is reduced and released. The DPNR catalyst 4b contains additional catalyst for oxidizing and burning PM trapped in the filter (e.g. oxidation catalyst whose principal component is noble metal, such as Pt).

The exhaust gas purification system includes the catalytic converter 4, the supplemental fuel valve 25, and the supplemental fuel passage 27, as well as an electronic control unit (ECU) 100. The ECU 100 controls opening/closing of the supplemental fuel valve 25.

The engine 1 has a turbocharger (compressor) 5. The turbocharger 5 includes a turbine shaft 5a, a turbine wheel 5b and a compressor impeller 5c, the turbine wheel 5b and the compressor impeller 5c are connected to each other via the turbine shaft. 5a. The compressor impeller 5c faces the interior of the intake pipe 64, while the turbine wheel 5b faces the interior of the exhaust pipe 73. The turbocharger 5 thus configured utilizes an exhaust flow (exhaust pressure) received by the turbine wheel 5b to rotate the compressor impeller 5c in order to forcibly induct air into the engine. In this embodiment, the turbocharger 5 is a variable nozzle turbocharger having a variable nozzle. vane mechanism 5d on the side of the turbine wheel 5b. The boost pressure of the engine 1 may be regulated by controlling the opening degree of the variable nozzle vane mechanism 5d.

The intake system 6 has an intercooler 61 provided on the intake pipe 64. The intercooler 61 cools intake air whose temperature has increased due to the forced induction by the turbocharger 5. The throttle valve 62 is also provided in the intake pipe 64 downstream of the intercooler 61. The throttle valve 62 is an electronically controlled valve whose opening varies continuously. The throttle valve 62 reduces the cross-section of the intake air passage under certain conditions to control (decrease) the volume of intake air.

The engine 1 has an exhaust gas recirculation (EGR) passage 8 that connects the intake system 6 and the exhaust system 7. The EGR passage 8 recirculates some exhaust gas to the intake system 6 as required and supply such exhaust gas back to the combustion chambers 3 to lower the combustion temperature. This decreases the amount of $NO_x$ emissions. The EGR passage 8 has an EGR valve 81 and an EGR cooler 82 that cools exhaust gas passing (recirculating) through the EGR passage 8. The volume of EGR to be introduced from the exhaust system 7 to the intake system 6 (volume of exhaust gas to be recirculated) may be adjusted by controlling the opening degree of the EGR valve 81.

The sensors will now be described. The engine 1 has several types of sensors installed at specific locations thereof. The sensors output signals that indicate the environmental conditions of the specific locations as well as signals indicating the operating conditions of the engine 1.

For instance, the airflow meter 32, upstream of the throttle valve 62 in the intake system 6, outputs a signal that indicates the detected flow rate of intake air (intake air volume). The intake temperature sensor 33, provided on the intake manifold 63, outputs a signal that indicates the detected temperature of the intake air. The intake pressure sensor 34, provided on the intake manifold 63, outputs a detection signal in response to the pressure of intake air. An A/F (air-fuel ratio) sensor 35, downstream of the catalytic converter 4 in the exhaust system 7, outputs a detection signal, which continuously varies depending on the oxygen concentration in exhaust gas. An exhaust gas temperature sensor 36, downstream of the catalytic converter 4 in the exhaust system 7, outputs a signal that indicates the detected exhaust gas temperature. A rail pressure sensor 37 outputs a signal that indicates the detected pressure of the fuel stored in the common rail 22. A throttle opening sensor 39 detects a degree of opening of the throttle valve 62.

Figure 2:
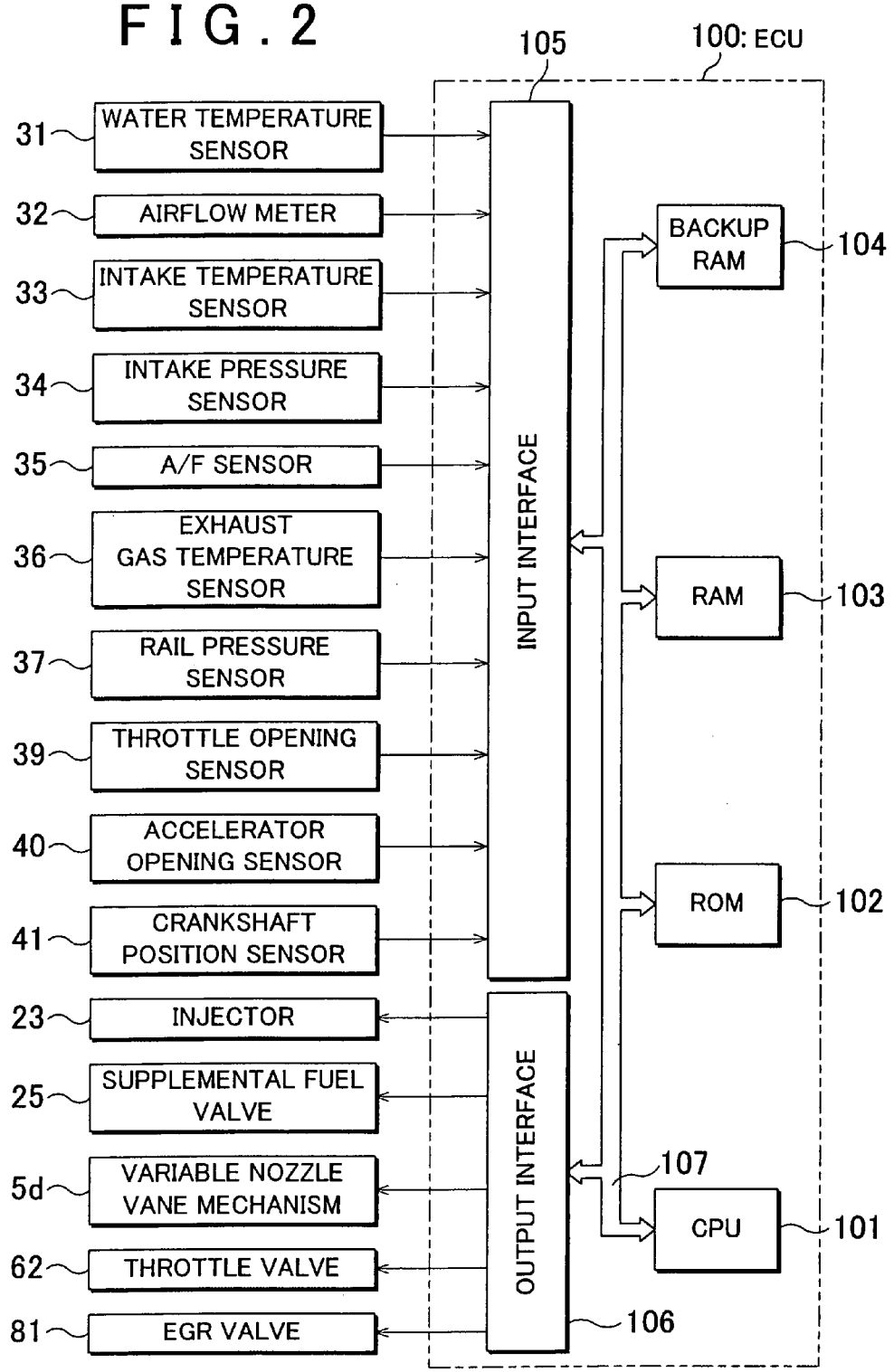
FIG. 2 is a block diagram of a configuration of a control system, including an ECU.

The ECU will now be described. As shown in FIG. 2, the ECU 100 includes a CPU 101, a ROM 102, a RAM 103 and a backup RAM 104. The ROM 102 stores several control programs, maps to be used for executing these control programs, and other data. The CPU 101 executes various operations in accordance with the respective control programs and maps stored in the ROM 102. The results of the operations in the CPU 101 and data inputted from the respective sensors are temporarily stored in RAM 103. The backup RAM 104 is a nonvolatile memory for saving stored data upon power-off, such as the engine 1 stop.

The ROM 102, the CPU 101, the RAM 103 and the backup RAM 104 are connected to each other via a bus 107, while being connected to an input interface 105 and an output interface 106.

The input interface 105 connects to the airflow meter 32, the intake temperature sensor 33, the intake pressure sensor 34, the A/F sensor 35, the exhaust gas temperature sensor 36, the rail pressure sensor 37, and the throttle opening sensor 39.

In addition, the input interface 105 connects to a water temperature sensor 31, an accelerator depression sensor 40 and a crankshaft position sensor 41. The water temperature sensor 31 outputs a signal that indicates the detected coolant temperature in the engine 1. The accelerator depression sensor 40 outputs a signal that indicates the detected displacement of the accelerator pedal. The crankshaft position sensor 41 outputs a pulse when the output shaft (crankshaft) of the engine 1 rotates by a given angle. In turn, the output interface 106 connects to the injector 23, the supplemental fuel valve 25, the variable nozzle vane mechanism 5d, the throttle valve 62, the EGR valve 81 and others.

The ECU 100 executes the respective controls in the engine 1 based on the outputs from the aforementioned sensors. In addition, the ECU 100 also executes the PM catalyst regeneration control, the sulfur poisoning recovery control and the intake air volume control during engine deceleration, which will be described later.

The PM catalyst regeneration control will now be described. The ECU 100 first estimates the amount of PM deposits in the DPNR catalyst 4b. One approach to estimating the amount of PM deposits is to use a map plotted with experimental data on the amount of PM adhesion that varies depending on the operating conditions of the engine 1 (e.g. exhaust gas temperature, fuel injection quantity and engine speed). The amounts of PM adhesion read from the map are summed to obtain the amount of PM deposits. Alternatively, the amount of PM deposits may be determined based on the vehicle driving distance or driving duration. Still another alternative is to use a differential pressure sensor, disposed in the catalytic converter 4, to detect the pressure differential between upstream and downstream of the DPNR catalyst 4b. The amount of PM deposits trapped by the DPNR catalyst 4b is then calculated based on the output from the differential pressure sensor.

If the estimate amount of PM deposits is equal to or larger than a specified reference amount (threshold deposit amount), the ECU 100 determines to start regeneration of the DPNR catalyst 4b and executes the PM catalyst regeneration control. More specifically, the ECU 100 calculates a required supplemental fuel supply quantity and supply interval based on the engine speed Ne output from the crankshaft position sensor 41 with reference to the map previously plotted with the experimental results. According to the calculation result, the ECU 100 controls the operation of the supplemental fuel valve 25, through which fuel is supplied to the exhaust system 7 continuously. The supplemental fuel supply results in a rise in temperature of the DPNR catalyst 4b, which promotes oxidization of the PM deposits in the DPNR catalyst 4b to $H_2O$ and $CO_2$ emissions.

A description is now made of the sulfur poisoning recovery control, which is executed by the ECU 100. The sulfur poisoning recovery control releases sulfur from the NSR catalyst 4a and the DPNR catalyst 4b. This is achieved by increasing the catalyst bed temperature by continuously supplying from the supplemental fuel valve 25, while controlling the air-fuel ratio of exhaust gas to the stoichiometric or richer ratio. In the embodiment of the invention, the ECU 100 executes the PM catalyst regeneration control before executing the sulfur poisoning recovery control.

In addition to the PM catalyst recovery control and the sulfur poisoning recovery control, the ECU 100 also executes catalyst controls including an $NO_x$ reduction control. The $NO_x$ reduction control reduces and releases $NO_x$ adsorbed by the NSR catalyst 4a and the DPNR catalyst 4b, to $N_2$, $CO_2$ and $H_2O$ by intermittently supplying fuel from the supplemental fuel valve 25.

Next, the intake air volume control during deceleration will be described. Before the sulfur poisoning recovery control is executed, the exhaust gas purification system in the engine 1 performs the PM catalyst regeneration control to burn PM deposits in. the DPNR catalyst 4b. This is called a "soot removal" process. Thereby, the amount of PM deposits is reduced already at the time of effecting the sulfur poisoning recovery control after the PM catalyst regeneration control. There is thus no excessive increase in catalyst bed temperature that can occur as a result of burning the PM deposits. In such situation, however, if the volume of intake air increases due to deceleration in the same manner as under the PM catalyst regeneration control, an excess volume of air would pass through the NSR catalyst. This prevents the catalyst bed temperature from being kept high, so that the temperature decreases. As a result of such lower catalyst bed temperature, recovery from sulfur poisoning is more difficult. Accordingly, it takes longer for the $NO_x$ storage reduction catalyst to recover from sulfur poisoning, which increases the supplemental fuel supply quantity. Also, an extra quantity of supplemental fuel is required for raising the catalyst bed temperature, resulting in poor fuel economy.

In order to solve the problems, the embodiment of the invention provides the following feature: A target value for controlling the intake air volume (i.e. target throttle opening degree) during deceleration is determined for the sulfur poisoning recovery control. The target value is preset smaller than the value for the PM catalyst regeneration control. This allows the intake air volume to be controlled properly during the sulfur poisoning recovery control, thereby preventing a drop in catalyst bed temperature.

Figure 3:
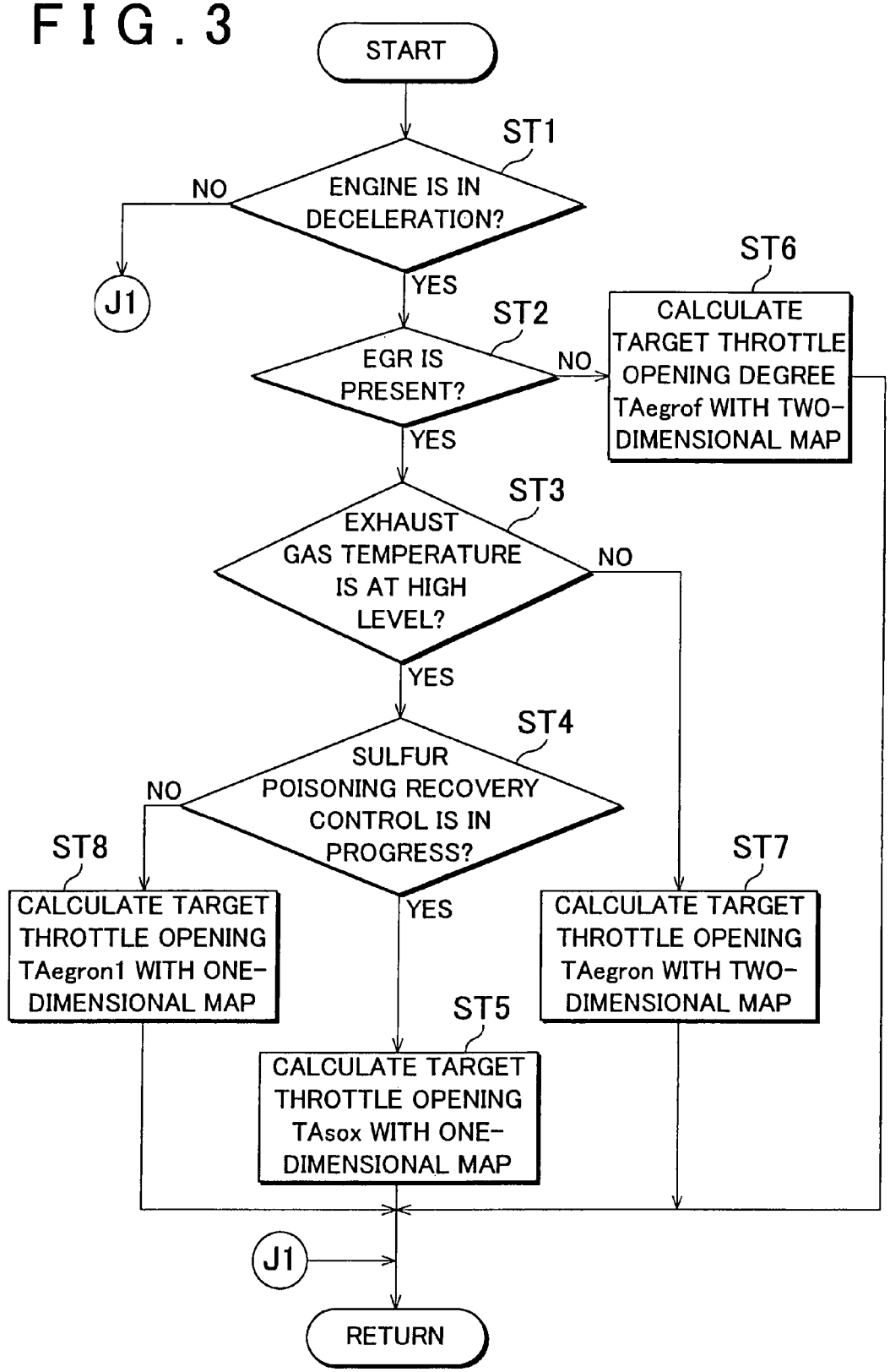
FIG. 3 is an example flowchart showing a process of determining a throttle opening degree during deceleration, which is executed by the ECU.

A specific example of the process of determining the throttle opening degree during deceleration is described below with reference to the flowchart in FIG. 3. It is the ECU 100 that executes this determination process. The determination process is repeated at predetermined time intervals.

In the step ST1, the ECU 100 determines whether or not the engine 1 is decelerating. If the engine 1 is not decelerating, the routine ends temporally. If the engine 1 is decelerating, the process goes to the step ST2. The deceleration of the engine 1 determined based on the presence or absence of the main fuel injection. In the embodiment of the invention, if a command value for the injection quantity is equal to or lower than "0" (e.g. command value for injection quantity<–5 $mm^3$/st), it is determined that the engine is decelerating.

In the step ST2, the ECU I00 determines whether or not EGR is executed when the engine 1 is decelerating. To be more specific, the ECU 100 determines whether the EGR valve opening degree is greater than 0%. If the result of the determination is true, the process goes to the step ST3. If the result of the determination is false, the process goes to the step ST6. The aforementioned determination for EGR is made in the step ST2 due to the following reasons:

For engine control, the EGR valve 81 is normally kept open. However, the EGR valve 81 is closed sometimes, depending on environmental conditions during the engine control or the degree of correction of the latest operating conditions. If the EGR valve 81 is closed, controlling the throttle opening degree based on an assumption that the EGR valve 81 is open causes an excessive drop in internal pressure in the intake pipe. Thus, when the EGR valve 81 is closed (the result of the determination in the step ST2 is false), the process goes to the step ST6 to calculate a target throttle opening degree TAegrof for the closed EGR valve 81. To be more specific, the engine speed Ne is read from the output of the crankshaft position sensor 41, and the coolant temperature in the engine 1 is read from the output of the water temperature sensor 31. Then, based on the engine speed Ne and the coolant temperature, the target throttle opening degree TAegrof is calculated with reference to a specific map (two-dimensional map) for the closed EGR valve 81.

The ECU 100 controls actuation of the throttle valve 62 such that the actual throttle opening degree (value detected by the throttle opening sensor 39) matches the target throttle opening degree TAegrof calculated in the step ST6. Thereby, the volume of intake air during deceleration is controlled in consideration of the closed EGR valve 81.

The two-dimensional map for calculating the target throttle opening degree TAegrof uses the engine speed Ne and the coolant temperature as parameters. This map is plotted with experimental and calculation data on the throttle opening degree to maintain an appropriate internal pressure in the intake pipe. The ECU 100 stores the map in the ROM 102. The two-dimensional map for calculating the target throttle opening degree TAegrof for the closed EGR valve 81 is designed to have a larger target throttle opening degree, in other words, a larger target value for controlling the intake air volume during deceleration, compared to an ordinary map (used in the step ST7) for calculating a target throttle opening degree TAegron for the opened EGR valve 81. The ordinary map will be discussed later.

In the step ST3, the ECU 100 determines whether the exhaust gas temperature read from the output of the exhaust gas temperature 36 is at a high level (e.g. 500-750° C.). If the exhaust gas temperature is not at a high level, the process goes to the step ST7 to calculate the target throttle opening degree TAegron with reference to the two-dimensional map that is applied under normal operating conditions. To be more specific, the engine speed Ne is read from the output of the crankshaft position sensor 41, and the coolant temperature in the engine 1 is read from the output of the water temperature sensor 31. Then, based on the engine speed Ne and the coolant temperature, the target throttle opening degree TAegron is calculated with reference to the two-dimensional map.

The ECU 100 controls actuation of the throttle valve 62 such that the actual throttle opening degree (value detected by the throttle opening sensor 39) matches the target throttle opening degree TAegron calculated in the step ST7. Thereby, the volume of intake air during deceleration is controlled in consideration of the opened EGR valve 81 and the low exhaust gas temperature.

The two-dimensional map for calculating the target throttle opening degree TAegron uses the engine speed Ne and the coolant temperature as parameters. This map is plotted with experimental and calculation data on the throttle opening degree by taking into account the intake air volume during deceleration so as to maintain the catalyst bed temperature. The ECU 100 stores the map in the ROM 102.

The coolant temperature is included as one of the parameters in the two-dimensional maps used in the steps ST6 and ST7 due to the reasons described below. If a coolant temperature is low, a smaller volume of EGR results, compared to the case of a higher coolant temperature, i.e. in the engine warm-up conditions. Controlling the throttle opening degree based on the volume of EGR assumed for the engine warm-up conditions causes an excessive drop in internal pressure in the intake pipe. In view of the problem, the coolant temperature is included as a parameter in the map for calculating the target throttle opening degree. This allows compensating the impact of the lower coolant temperature, thereby maintaining the internal pressure in the intake pipe at an appropriate level.

In contrast, if the result of the determination in the step ST3 is true, that is, the exhaust gas temperature is at a high level, the process goes to the step ST4 to determine whether the sulfur poisoning recovery control is in progress. If the result of the determination is false, the ECU 100 determines that the PM catalyst regeneration control is in progress or the vehicle runs in normal driving mode with a high exhaust gas temperature (e.g. long-hours, high-speed driving). Then, the process goes to the step ST8 to calculate a target throttle opening degree TAegron1.

Figure 4:
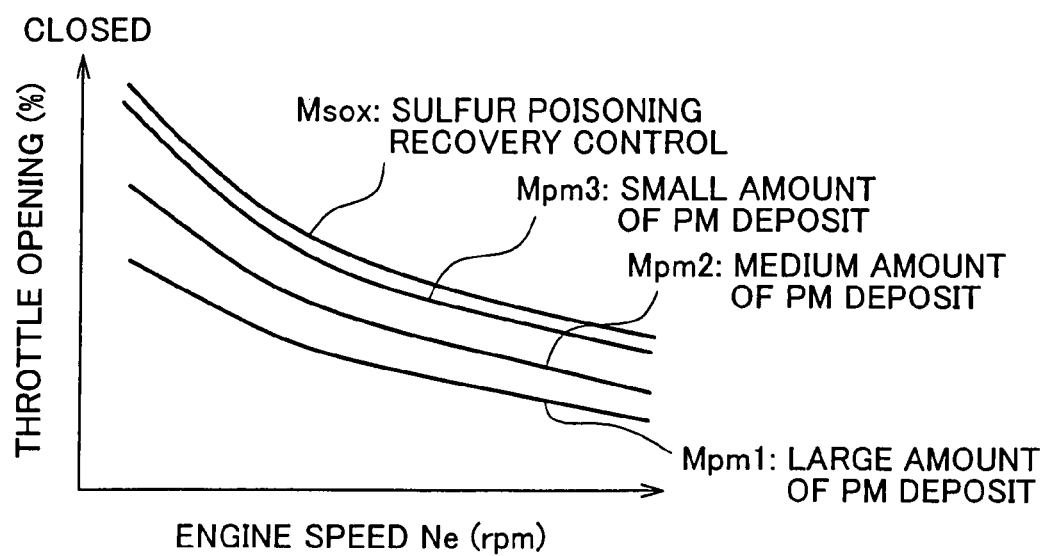
FIG. 4 is a one-dimensional map for calculating the throttle opening degree, which is used for the process of determining the throttle opening degree during deceleration in FIG. 3.

More specifically, based on the engine speed Ne read from the output of the crankshaft position sensor 41, the target throttle opening degree TAegron1 is calculated with reference to a one-dimensional map including Mpm1 to Mpm3 shown in FIG. 4.

Either Mpm1, Mpm2 or Mpm3 is selected from the one-dimensional map depending on the (estimate) amount of PM deposits in the DPNR catalyst 4b to calculate the target throttle opening degree TAegron1.

The ECU 100 controls actuation of the throttle valve 62 such that the actual throttle opening degree (value detected by the throttle opening sensor 39) matches the target throttle opening degree TAegron1 calculated in the step ST8. Thereby, the volume of intake air during deceleration is controlled in consideration of the opened EGR valve 81 and the high exhaust gas temperature.

As shown in FIG. 4, the one-dimensional map including Mpm1 to Mpm3 uses the engine speed Ne as a parameter and is plotted with experimental and calculation data on the target throttle opening degree that are obtained empirically. The ECU 100 stores this map in the ROM 102. The one-dimensional map in FIG. 4, Mpm1 to Mpm3, includes. three regions, which are defined by dividing the allowable range of the amount of PM deposits between 0 and maximum into three: "Mpm1: large amount of PM deposits," "Mpm2: medium amount of PM deposits" and "Mpm3: small amount of PM deposits." The Mpm1, Mpm2 and Mpm3 are designed to have their respective throttle opening degrees, in other words, intake air volumes during deceleration, which become smaller as the order of Mpm1, Mpm2 and Mpm3.

In turn, if the result of the determination in the step ST4 is true, that is, the sulfur poisoning recovery control is in progress, the process goes to the step ST5 to calculate a target throttle opening TAsox for the sulfur poisoning recovery control. More specifically, based on the engine speed Ne read from the output of the crankshaft position sensor 41, the target throttle opening degree TAsox is calculated with reference to a one-dimensional map Msox shown in FIG. 4. The ECU 100 controls actuation of the throttle valve 62 such that the actual throttle opening degree (value detected by the throttle opening sensor 39) matches the target throttle opening degree TAsox calculated in the step ST5. Thereby, the volume of intake air during deceleration is controlled for the sulfur poisoning recovery control.

The sulfur poisoning recovery control is executed following the PM catalyst regeneration control. Therefore, the sulfur poisoning recovery control needs a smaller volume of intake air during deceleration, compared to the PM catalyst regeneration control. In view of this, the one-dimensional map Msox, used for the sulfur poisoning recovery control, is designed to have a smaller target throttle opening degree, in other words, a smaller target value for controlling the intake air volume during deceleration, compared to the one-dimensional map Mpm3 (small amount of PM deposits) used for the PM catalyst regeneration control. To be more specific, the one-dimensional map Msox for the sulfur poisoning recovery control uses the engine speed Ne as a parameter. This map is plotted with experimental and calculation data on the throttle opening degree that are obtained empirically by taking into account the intake air volume during deceleration so as to maintain the catalyst bed temperature. The ECU 100 stores the map in the ROM 102.

A target throttle opening degree shown in the map Msox for the sulfur poisoning recovery control may be preset equal to or close to the target throttle opening shown in the two-dimensional map (used in the step ST7) applied to the normal driving conditions (the opened EGR valve 81 and the low exhaust gas temperature).

As described above, in the embodiment of the invention, the sulfur poisoning recovery control is executed after the PM catalyst regeneration control for the purpose of "soot removal" by which the PM deposits in the DPNR catalyst 4b are burned. For the sulfur poisoning recovery control, the target throttle opening is reduced to reduce the volume of intake air during deceleration, thereby preventing the catalyst bed temperature from dropping. Thus, the catalyst bed temperature is maintained at a level appropriate for the sulfur poisoning recovery. This results in more efficient catalyst recovery from sulfur poisoning, and therefore a shorter recovery time and also reduces the quantity of supplemental fuel needed to raise the catalyst bed temperature. Consequently, the fuel economy does not decrease as a result of the sulfur poisoning recovery control.

In the embodiment of the invention, when a high exhaust gas temperature is produced, either one of the maps: Mpm1 to Mpm3, may be selected depending on the amount of PM deposits in the DPNR catalyst 4b to calculate the target throttle opening degree (Mpm1 for a large amount of PM deposits, Mpm2 for a medium amount of PM deposits and Mpm3 for a small amount of PM deposits). This allows the appropriate intake air volume during deceleration appropriate to the amount of PM deposits in the DPNR catalyst 4b to be determined. This therefore prevents a drop in catalyst bed temperature due to an excessive increase in intake air volume during the PM catalyst regeneration control. Thereby, more efficient PM catalyst regeneration is achieved.

Next, another embodiment of the invention will be described. In the embodiment described above, the exhaust gas purification system of the invention is applied to the direct-injection four-cylinder diesel engine. However, the invention is not limited to this embodiment. Alternatively, the exhaust gas purification system of the invention may be applied to other diesel engines having any number of cylinders, such as a direct-injection six-cylinder diesel engine. In addition, to direct-injection diesel engines, the invention may also be applied to other types of diesel engines. Further, the invention may be intended not only for vehicle engines, but also for engines designed for other purposes.

In the embodiment previously described, the catalytic converter 4 includes the NSR ($NO_x$ storage reduction) catalyst 4a and the DPNR catalyst 4b. Alternatively, the catalytic converter 4 may include a DPF in addition to the NSR catalyst 4a or an oxidation catalyst.

While the invention has been described with reference to examples embodiments thereof, it is to be understood that the invention is not limited to the described embodiments or constructions. To the contrary, the invention is intended to cover various modifications and equivalent arrangements. In addition, while the various elements of the embodiments are shown in various example combinations and configurations other combinations and configurations, including more, less or only a single element, are also within the scope of the invention.

What is claimed is:

1. An exhaust gas purification system for an internal combustion engine, comprising:
   a catalyst disposed in an exhaust passage of the internal combustion engine;
   a supplemental fuel valve that supplies supplemental fuel, used for the internal combustion engine, to the exhaust passage; and
   an electronic control unit comprising a program on a computer readable medium which when executed:
      determines a deceleration of the internal combustion engine based on a presence or absence of a main fuel injection;
      based on the determination of the deceleration, executes a particulate matter catalyst regeneration with a first target intake air volume; and
      based on the determination of the deceleration, executes a sulfur poisoning recovery with a second target intake air volume, the second target intake air volume being smaller than the first target intake air volume.

2. The exhaust gas purification system for an internal combustion engine according to claim 1, wherein the particulate matter catalyst regeneration is executed before the sulfur poisoning recovery control.

3. The exhaust gas purification system for an internal combustion engine according to claim 1, wherein when an amount of particulate matter deposits is smaller than a reference amount, the electronic control unit sets the first target intake volume during the particulate matter catalyst regeneration smaller than when the amount of particulate matter deposits is equal to or larger than the reference amount.

4. The exhaust gas purification system for an internal combustion engine according to claim 1, wherein the internal combustion engine is a diesel engine.

5. The exhaust gas purification system for an internal combustion engine according to claim 1, wherein the internal combustion engine is mounted on a vehicle.

6. The exhaust gas purification system for an internal combustion engine according to claim 1, wherein each target value for controlling the intake air volume during the sulfur poisoning recovery and the particulate matter catalyst regeneration is determined by adjusting a degree of throttle opening in the internal combustion engine.

7. An exhaust gas purification method for an internal combustion engine, comprising:
   supplying supplemental fuel, used for the internal combustion engine, to an exhaust passage including a catalyst;
   determining a deceleration of the internal combustion engine based on presence or absence of a main fuel injection;
   based on the determination of the deceleration, executing a particulate matter catalyst regeneration with a first target intake air volume; and
   based on the determination of the deceleration, executing a sulfur poisoning recovery with a second target intake air volume, the second target intake air volume being smaller than the first target intake air volume.

8. The exhaust gas purification method for an internal combustion engine according to claim 7, wherein the particulate matter catalyst regeneration is executed before the sulfur poisoning recovery is executed.

9. The exhaust gas purification method for an internal combustion engine according to claim 7, wherein if an amount of particulate matter deposits is smaller than a reference amount when the particulate matter catalyst regeneration is executed, the first target intake air volume is set smaller than if the amount of particulate matter deposits is equal to or larger than the reference amount.

10. The exhaust gas purification method for an internal combustion engine according to claim 7, wherein the target intake air volume for each of the sulfur poisoning recovery and the particulate matter catalyst regeneration is achieved by adjusting a degree of throttle opening in the internal combustion engine.

* * * * *